Figure 1:
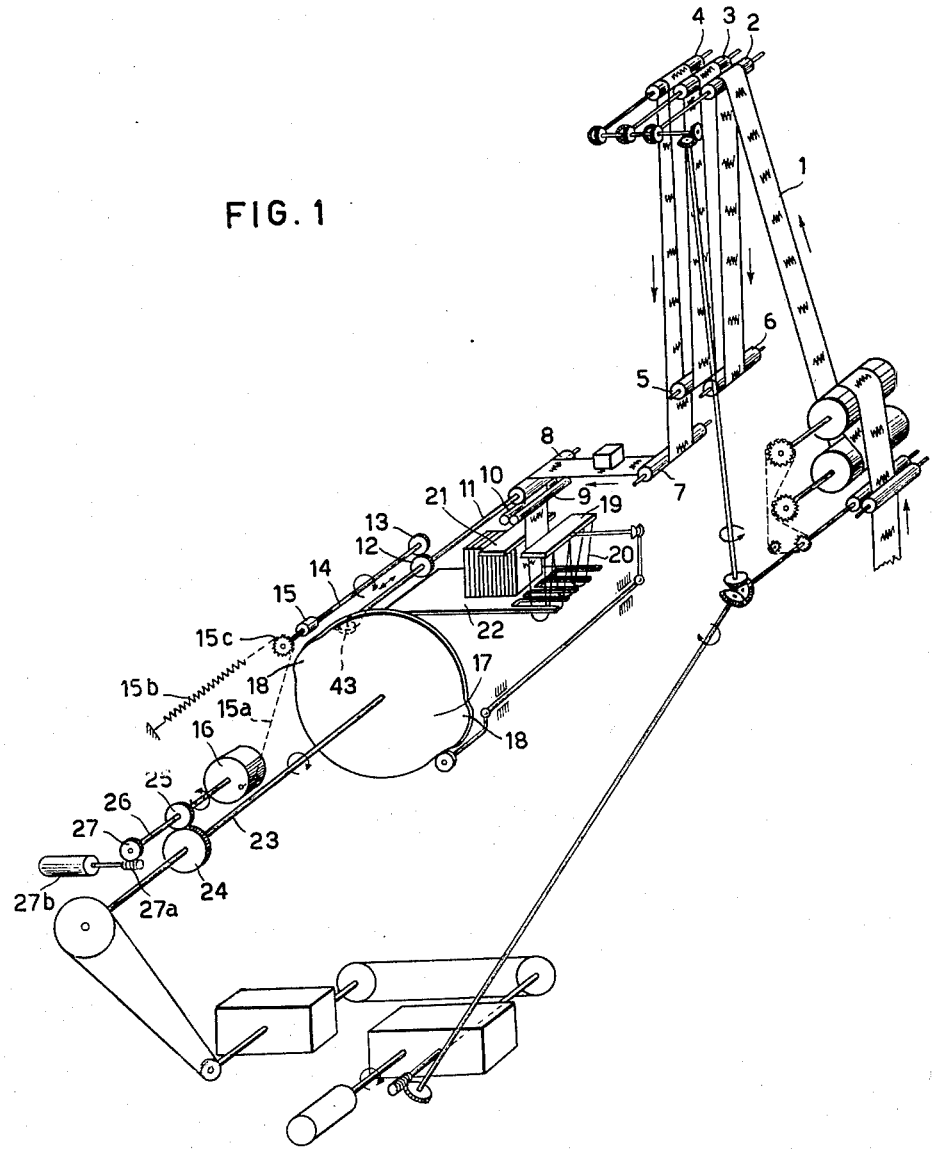

Nov. 1, 1960

H. G. M. DICKER 2,958,451

MACHINE FOR FEEDING A CONTINUOUS
STRIP OF MATERIAL

Filed Sept. 24, 1956

2 Sheets-Sheet 2

United States Patent Office 2,958,451
Patented Nov. 1, 1960

2,958,451

MACHINE FOR FEEDING A CONTINUOUS STRIP OF MATERIAL

Hermanus G. M. Dicker, Nimeguen, Netherlands, assignor to Kunstzijdespinnerij Nyma N.V., Nimeguen, Netherlands, a limited-liability company Filed Sept. 24, 1956, Ser. No. 611,682

Claims priority, application Netherlands Sept. 22, 1955

2 Claims. (Cl. 226—117)

The present invention relates to a machine for feeding a continuous strip of material, such as bands or thin-walled tubes of metal, paper, cardboard, pasteboard, polyethylene, polyvinyl chloride, cellulose acetate, regenerated cellulose or other natural or synthetic sheet materials. Such a machine may be used to feed the continuous strip of material to a cutting device adapted to cut the strip into individual pieces and to make piles of such pieces, as disclosed and claimed, for instance, in my divisional application Serial No. 824,149, filed June 25, 1959.

This invention constitutes an improvement over that disclosed in my application Serial No. 502,640, filed April 20, 1955, and abandoned on March 17, 1956.

If somewhat sticky sheet material, such as wet regenerated cellulose, is to be cut and stacked, the continuous strip of material may contact and stick to the pile of cut pieces. This difficulty may be surmounted by increasing the stroke of the cutting blade so that the pile is pushed farther away from the continuous strip of material being fed thereto. This means that the velocity of the cutting blade must be increased for a given supply rate and a given length of cutting. However, this causes an undue increase in the loads to which the control members of the cutting blade movement are subjected. Alternatively, the increase in stroke of the cutting blade may be obtained by decreasing the supply rate of the continuous strip or by supplying the strip intermittently to the cutting blade.

It is an object of the present invention to provide an intermittent feed which enables the apparatus to work effectively without a decrease in its productive capacity.

This and other objects are accomplished in a machine for feeding a continuous strip of material, which comprises supply rollers for feeding the strip of material and means for converting the continuous feeding movement of the supply rollers into an intermittent material supply, which means includes a one-way clutch and an eccentric means which may be adjusted during the operation of the machine to change the length of the cut pieces. This adjustment is particularly advantageous when printed sheet material with continuously repeating figures is to be cut and stacked since such material must be cut accurately along the limits of the printed figures and small variations in the cutting length must be immediately corrected.

Preferably, two sets of supply rollers are provided, the first set taking up the material continuously and the second set of rollers supplying the material intermittently, the first set of rollers including dancing rollers for the supply of the material during the stationary period of the second set.

According to a further preferred embodiment, the second set of supply rollers comprises two closely positioned rollers, and a third roller arranged to be contacted by the material over at least 90°.

Figure 2:
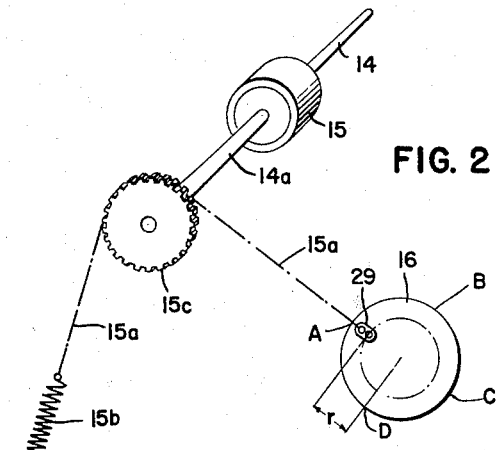
Figure 3:
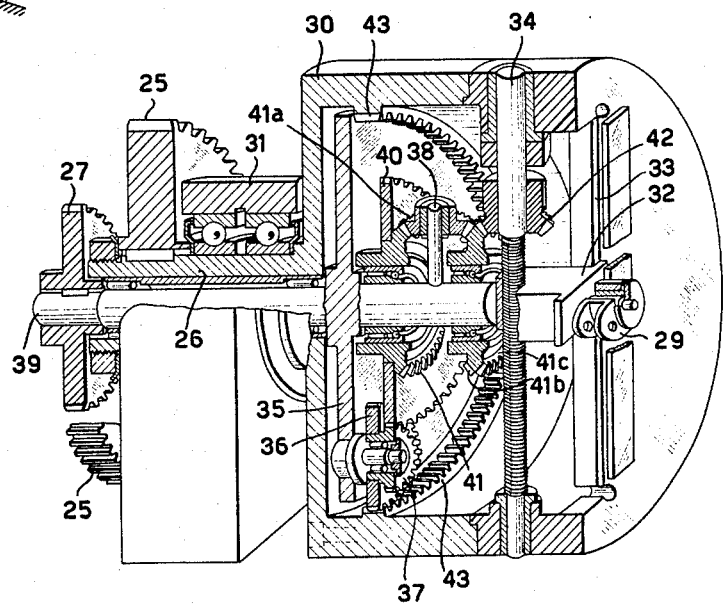

A preferred embodiment of the machine and its various details is illustrated by way of example in the accompanying drawing wherein Fig. 1 is a diagrammatic perspective view of the complete machine including the cutting device;

Fig. 2 is a detailed perspective view of the one-way clutch used to produce an intermittent material supply; and Fig. 3 is a section of an adjustable eccentric means.

Referring now to the drawing Fig. 1 shows a continuous strip of material 1 successively fed over a first set of rollers 2, 3, 4, 5 and 6 to a guide roller 7 and a second set of supply rollers 8, 9 and 10. The rollers 5 and 6 are dancing rollers and the rollers 9 and 10 are positioned closely to each other. The guide roller 7 is so arranged that strip 1 contacts roller 8 over at least 90° of its surface. This completely avoids the risk of slipping. Cooperating gears 12, 13 operatively connect shaft 11 of roller 8 with shaft 14. The section 14a of shaft 14 is connected thereto by one-way clutch 15 and the illustrated means for oscillating the shaft section 14a comprises an eccentric element 16, a gear 15c mounted on the shaft section and engaged by a flexible part 15a which may be a chain, and a resilient part 15b, which may be a spring. The oscillating structure will be more fully described in connection with Fig. 2. One-way clutch 15 translates the oscillation of shaft section 14a into a unidirectional movement of shaft 14, the latter transmitting a corresponding intermittent movement to shaft 11 with which it cooperates through gears 12, 13.

The strip 1 is continuously supplied to the first set of rollers and, while the second set of rollers remains stationary due to the intermittent rotation of shaft 11, excess material is taken up by the descent of dancing rollers 5 and 6.

Fig. 2 diagrammatically shows a conventional one-way clutch 15 connecting the shaft section 14a to shaft 14. The end of shaft section 14a carries gear 15c which cooperates with chain 15a. One end of the chain is connected to eccentric pin 29 while its other end is connected to spring 15b which is fixedly mounted on the machine. When the eccentric pin 29 revolves, shaft section 14a oscillates. During the path ABC of pin 29, shaft 14 is rotated. During path CDA of the pin, one-way clutch 15 prevents rotation of shaft 14 since shaft section 14a oscillates in the reverse direction during the cycle. Therefore, an intermittent unidirectional rotation is imparted to shaft 14.

The extent of the angle over which shaft 14 is rotated when eccentric pin 29 moves over path ABC is determined by the eccentricity r of the pin, thus determining the length of the strip supplied by rollers 8, 9, 10.

One particular embodiment of a means for adjusting the eccentricity of eccentric means 16 is illustrated in Fig. 3.

As shown, the adjustable eccentric means comprises a cylindrical box 30 with two flat end walls, a hollow shaft 26 being connected to one end wall and being coaxial with the box. The hollow shaft rotates in bearing sleeve 31. Eccentric means 29 is movably mounted in the other end wall of the box by means of a support means constituted by a plate 32 which may be shifted in groove 33 in the end wall. The plate 32 may be moved in the groove by rotating threaded rod 34 which is rotatably mounted in the cylindrical box and threadedly engages the plate. The rotation of the threaded rod is effected in the following manner:

A shaft 39 is journaled in hollow shaft 26 and extends into box 30. Outside the box, gear 27 is keyed to shaft 39 for rotating this shaft. Inside the box, shaft 39 carries disc 35 which rotates with the shaft and has mounted thereon gears 36 and 37 which are coaxial with the disc. Crown gear 43 is fixedly mounted in the box and meshes with gear 36. Another gear 40 is mounted rotatably on disc shaft 39 and meshes with gear 37. Bevel gear 41 is mounted on and for rotation with gear 40. A third shaft 38 is perpendicularly mounted on the disc shaft and another bevel gear 41 is rotatably mounted on shaft 38. Bevel gears 41 and 41a mesh with each other and gear 40 operates the set of gears 41b and 41c. The bevel gear 41c meshes with a third bevel gear 42 mounted on the rotatable rod 34.

The eccentric movement hereinabove described operates as follows:

Normally, box 30 is rotated by means of gear 25 keyed to hollow shaft 26. Disc 35 is stationary but bevel gear 41 is rotated by the cooperation of crown gear 43 with gear 36 and of gear 37 with gear 40. The device is so designed that the number of revolutions of gears 40 and 41 is the same as that of the box, i.e. the ratio of the radius of crown gear 43 to that of gear 36 is equal to the ratio of the radius of gear 40 to that of gear 37. The direction of rotation of gear 40, however, is opposite to that of the box. Because gear 41a is positioned between gears 41 and 41b, these gears rotate in the same direction, in addition to the number of revolutions of gears 41b and 41c being equal to that of the box. It is clear that bevel gear 42 is not rotated when box 30 rotates with rod 34 and the eccentricity of the eccentric means 29 thus remains the same. If it is desired to adjust the eccentricity, gear wheel 27 is rotated to rotate rod 34 and thereby to shift eccentric pin 29, this rotation being effected by the cooperation of the gear train 43, 36, 37, 40, 41, 41a, 41b, 41c and 42.

The cutting device is fully described and claimed in my above-mentioned divisional application and will accordingly be described herein only sketchily. As shown in Fig. 1, cam disc 17 with cams 18, 18 moves the cutting blade 19 intermittently against counter-blade 21. Simultaneously, the pile pressing member 20 presses the cut-off pieces of the strip into a pile chamber defined by the underside of the counter-blade and platform 22. Cam disc 17 is driven by shaft 23 which, in turn, transmits its rotating movement to hollow shaft 26 of eccentric means 16, shaft 23 and 26 being coupled by cooperating gears 24, 25. The eccentricity control gear 27 (described in connection with Fig. 3) may be manually adjusted by hand wheel 27b and worm gear 27a.

A tube of regenerated cellulose was cut and stacked with the above-described machine with a supply rate of 15 cm./sec. and a stroke length of the cutting blade of 2½ cm. The cutting and stacking operation was carried out without disturbances and without undue stress on any of the operating parts.

I claim:

1. A machine for feeding a continuous strip of material, comprising supply rollers for feeding the strip of material, a shaft having one section operatively cooperating with the supply rollers and another section, means operatively cooperating with the other shaft section for oscillating said other shaft section, said oscillating means including a revolving eccentric element, a flexible part having one end connected to the eccentric element and a resilient part having one end connected to the other end of the flexible part, the other end of the resilient part being fixedly mounted, means for adjusting the eccentricity of the eccentric element during its revolution, and a one-way clutch connecting said shaft sections and operable to transmit only the oscillation in one direction from the other shaft section to the shaft section operatively cooperating with the supply rollers.

2. The machine of claim 1, comprising two sets of said supply rollers, the first set of said rollers taking up the material continuously and the second set of said rollers supplying material intermittently, said first set of rollers including dancing rollers for the supply of the material during the stationary period of the second set.

References Cited in the file of this patent

UNITED STATES PATENTS

| 638,731 | Macrae | Dec. 12, 1899 |
| 1,125,648 | Carlson | Jan. 19, 1915 |
| 1,288,576 | Hart | Dec. 24, 1918 |
| 1,379,005 | Eligh | May 24, 1921 |
| 2,137,724 | Lester | Nov. 22, 1938 |
| 2,319,485 | Alabrune | May 18, 1943 |
| 2,367,555 | Arney | Jan. 16, 1945 |

FOREIGN PATENTS

| 209,199 | Great Britain | Jan. 7, 1924 |